(12) United States Patent  (10) Patent No.: US 7,549,528 B2
Hansen et al.  (45) Date of Patent: Jun. 23, 2009

(54) BLOCK TURNING ARRANGEMENT

(75) Inventors: Erik Spangenberg Hansen, Østbirk (DK); Kjeld Andersen, Kjellerup (DK)

(73) Assignee: KVM Industrimaskiner A/S, Kjellerup (DK)

( * ) Notice: Subject to any disclaimer, the term of this patent is extended or adjusted under 35 U.S.C. 154(b) by 11 days.

(21) Appl. No.: 11/791,060

(22) PCT Filed: Nov. 22, 2005

(86) PCT No.: PCT/DK2005/000743

§ 371 (c)(1),
(2), (4) Date: Jul. 11, 2007

(87) PCT Pub. No.: WO2006/053569

PCT Pub. Date: May 26, 2006

(65) Prior Publication Data

US 2008/0164122 A1  Jul. 10, 2008

(30) Foreign Application Priority Data

Nov. 22, 2004 (DK) ............................... 2004 01819

(51) Int. Cl.
*B65G 47/24* (2006.01)

(52) U.S. Cl. ........................................ 198/406; 198/412
(58) Field of Classification Search ................. 198/399, 198/400, 411, 412, 413, 453; 193/44
See application file for complete search history.

(56) References Cited

U.S. PATENT DOCUMENTS

| 421,385 A | | 2/1890 | Chambers, Jr. | |
| 4,346,800 A | * | 8/1982 | Bennett et al. | ............... 198/412 |
| 5,222,586 A | * | 6/1993 | Ydoate et al. | ............... 198/452 |
| 5,950,800 A | * | 9/1999 | Terrell et al. | ................ 198/448 |
| 6,179,112 B1 | * | 1/2001 | Ertel, Jr. | ..................... 198/411 |
| 6,651,801 B1 | * | 11/2003 | Heckendorf | ................ 198/406 |
| 2003/0140916 A1 | | 7/2003 | Steckling | |

FOREIGN PATENT DOCUMENTS

| JP | 08/188230 | 7/1996 |
| WO | WO 03/070391 | 8/2003 |

* cited by examiner

*Primary Examiner*—James R Bidwell
(74) *Attorney, Agent, or Firm*—James Creighton Wray

(57) ABSTRACT

Turning arrangement (2) for concrete products, paving stones/flagstones for paving, curb stones for delimiting and blocks for erecting walls are arranged in a row with uniform orientation (4), the products (4) are advanced to a turning arrangement where the individual concrete product (6) is turned by the force of gravity.

4 Claims, 2 Drawing Sheets

BLOCK TURNING ARRANGEMENT

This application claims the benefit of Danish Application No. PA 2004 01819 filed Nov. 22, 2004 and PCT/DK2005/000743 filed Nov. 22, 2005, which are hereby incorporated by reference in their entirety.

The present invention concerns equipment for turning concrete products with rectangular shape.

Concrete products may e.g. be paving stones, small flagstones, curb stones or blocks for erecting walls. The concrete products may furthermore be artificially aged, often termed rumbled, broken or other kinds of finishing treatment. In the following, product refers to these groups.

The products are to be turned for different reasons. In some cases, the products are made in moulds so that the side with the largest relative area face upwards and downwards, respectively. In order to stack the products rationally, with regard to the subsequent process it may be expedient to have the products facing in a certain direction. They may also have to be turned in order that the other sides of the products are exposed to the surroundings, e.g. in connection with hardening, surface treatment such as impregnation, painting or similar, or by visual quality control.

There are a number of proposals for solving this task, see e.g. U.S. Pat. No. 421,385, where a first belt conveys the products, after which an belt disposed edgewise in parallel with the first belt turns the products so that the products come to rest upon a second surface. A similar principle is utilised in JP-A-08188230, where the products on a first belt are brought past a ramp partly overlapping the belt, so that the products are partly sliding on the slide. Due to the shape of the slide, the products are forced over on a second side face.

The prior art equipment for turning products is thus relatively complicated, as there are a plurality of interacting components (belts, slides and the like). This means that the equipment is in danger of interruption of the production. In connection with equipment with a turning belt as known from U.S. Pat. No. 421,385, this may occur in that a product is jammed between the two belts, whereby the products may fall down, the belt breaks, or the control of the relative speed of the two belts cause inexpedient accumulation of products on the belt. By the slide solution, the slide is in danger of acting as a stop for the products on the belt, whereby an accumulation of products occurs on the belt, or/and these fall off the belt.

The present invention thus presents a new and inventive equipment which does not have these drawbacks but solves the problem by means of a reliable and mechanically uncomplicated equipment.

The block turning arrangement receives a number of uniformly oriented, identical products, turning these products one quarter of a revolution about the longitudinal axis by means of the action of the force of gravity on the conveyed product.

When products have been arrayed in a row and are uniformly oriented on a conveyor system, there are numerous systems for orienting and arraying, and sometimes it may be suitable or desirable that these uniformly oriented products are turned one quarter of a revolution to utilise a possible stacking equipment more optimally, or to enable inspection of the product from several angles, or to enable stacking of the products at all.

The products typically emerge from an artificial ageing process, called a rumbling process, with subsequent arranging and aligning of the products, typically resting on their broadest surface. It may then be suitable that the products are raised subsequently, i.e. turned one quarter of a revolution so that they are conveyed on their narrowest surface.

Alternatively, the products may come from splitting, a breaking process, of the products, by which the cutting produces one or more fractured surfaces, after which it may be suitable to turn the products so that the fractured surfaces are uniformly oriented. This requires that one product is turned twice a quarter of a revolution, or that each half is turned one quarter of a revolution, each their way.

The turning arrangement functions in that the product to be turned is pushed out upon a support rail which is narrower than the downwards facing surface of the products, and when the product leaves the support, which is provided in the entire width of the product, the product will turn over by means of the force of gravity and be caught by a running belt under the narrow support rail. The distance from the narrow rail and down to the conveyor system down under is adapted to the height of the turned product.

In its simplest form, the turning arrangement operates by advancing the products in a long row with the products oriented uniformly, either lying or standing, the individual products in turn being pushed out on the turning means by the conveyor system, the turning means having a rail at one side which is narrower than half the downwards directed face on the product. When the product leaves the transporting system, the product is only supported on less than half of the downwards directed surface, and will therefore turn over and away from the support rail by means of the force of gravity. Under the support rail there is a second transporting system which simultaneously with operating as a gripper/collector further conveys the product out of the turning means. This transporting arrangement is disposed at a height that allows the product to fall down and turn it one quarter of a revolution. In order to ensure that the product does not continue its rotation and continues turning, there is provided a guide rail which catches the product and together with the above mentioned support rail forms a channel, so that the product cannot turn any more, the width of the channel is slightly greater than the new downwards directed surface of the product.

Additional preferred embodiments are defined in the dependent claims.

The invention will now be explained in more detail with reference to the drawings, on which:

DETAILED DESCRIPTION OF THE PREFERRED EMBODIMENTS

Figure 1A:
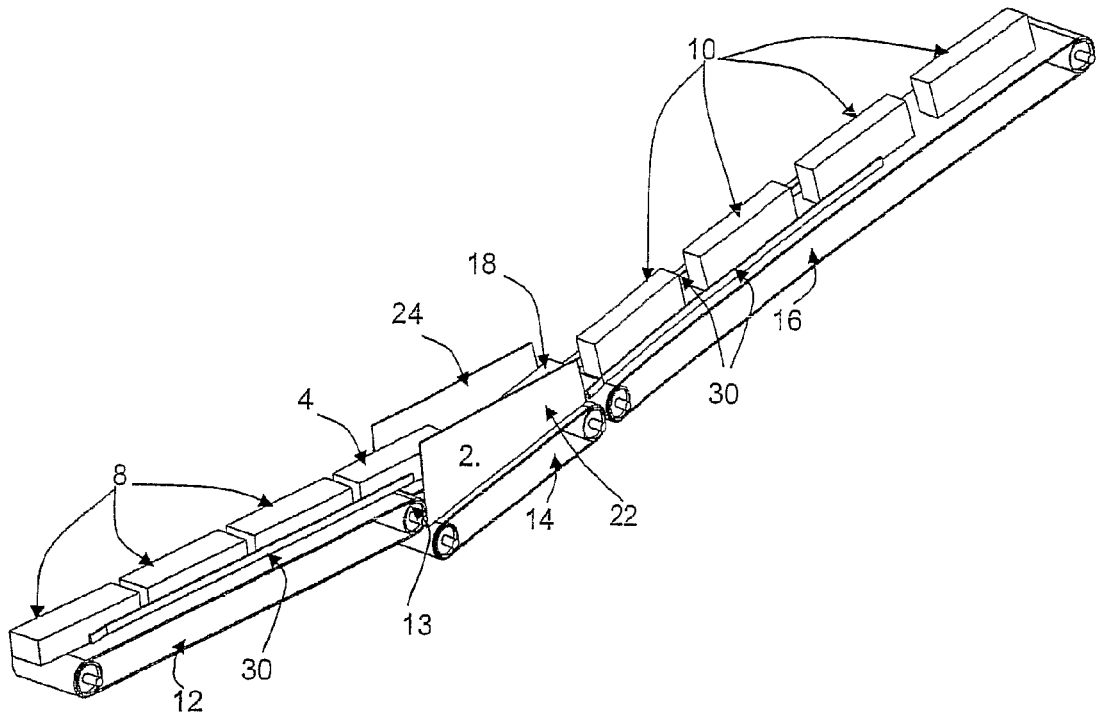
FIG. 1A shows a perspective view of a product turning means according to the invention in its simplest embodiment.

On FIG. 1, the turning arrangement (2) appears, where the transporting system (12, 14, 16) is shown as belt conveyors with guide rails (30) guiding the product (8, 10) into and out of the turning arrangement.

Figure 1B:
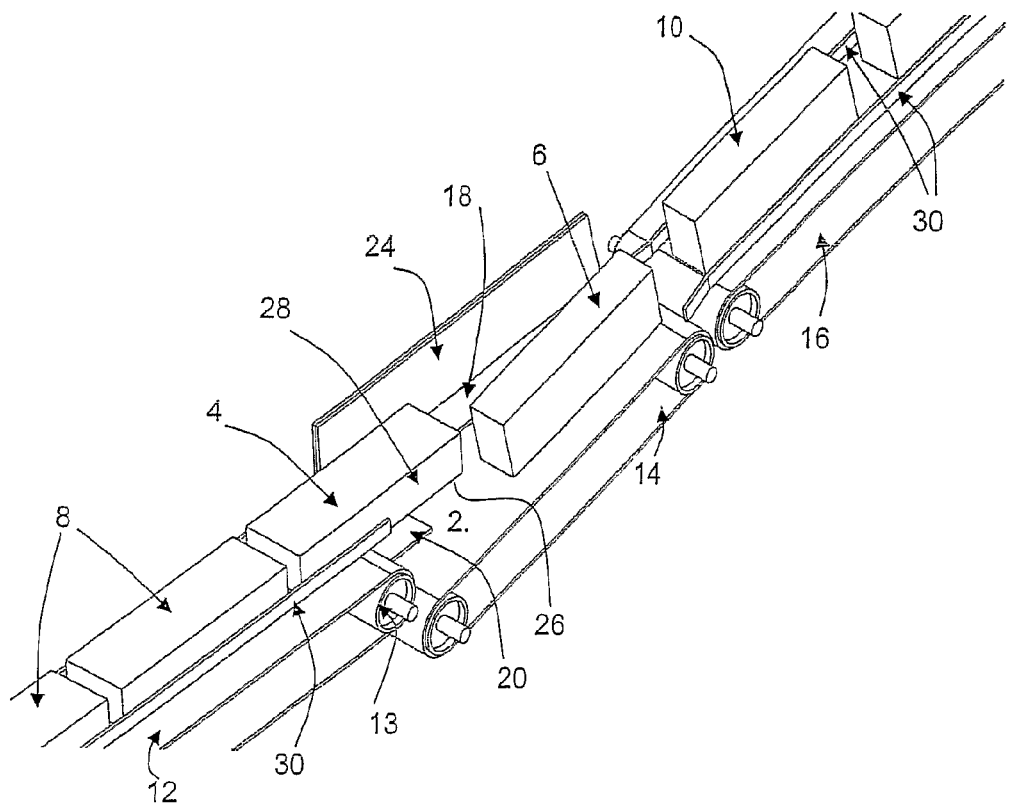
FIG. 1B shows the turning arrangement itself, where one side plate is removed for the sake of clarity.

The support rail (18) on FIG. 1B is here shown in a form where the product (4) is supported in its full width over the first length with a carrier plate (20); this is for preventing the product (6) from tipping down on the reversing roller (13) upon its turning in the arrangement (2) on the first conveyor belt (12). The support rail (18) then narrows to be narrower than half of the downwards directed surface on the product (26). This ensures that the product (6) by means of the force of gravity tilts down upon the transporting arrangement (14) provided in the turning arrangement. Opposite the support rail, a guide rail (22) is provided, not shown on FIG. 1B, ensuring that the product is caught and does not turn any further due to its inertia. This guide rail (22) together with the underside of the support rail (24) form a channel that allows the product to be caught and advanced in the turning arrangement on the now downwards directed surface (28). Then the product (6) continues over onto the third transporting arrangement (16).

Figure 2A:
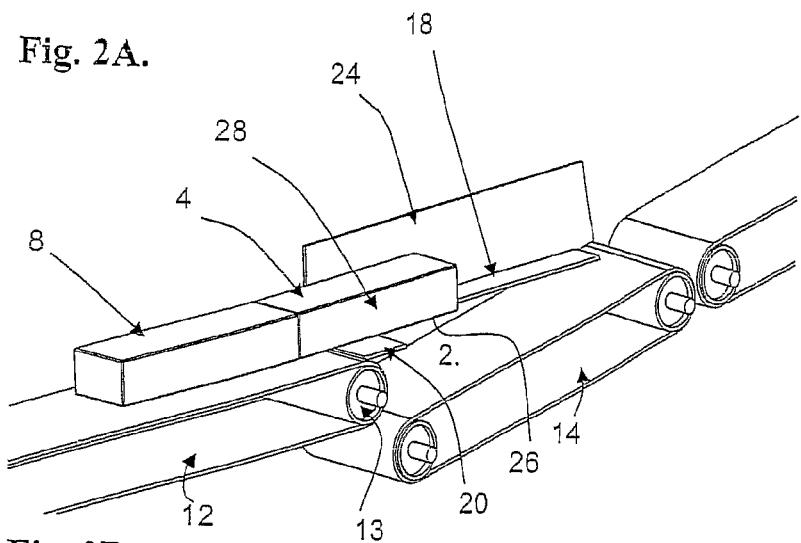
FIGS. 2A to 2C show in principle turning of the product in three steps.

On FIG. 2A appears a product on its way into the turning means (4). The product is conveyed by a conveyor belt (12) and is pushed out upon a support rail (18) which is narrower than the downwards directed surface (26) of the product. With regard to the transporting system shown here, the first part of the support rail (18) may be designed as a carrier plate (20) in the fall width of the product in order to prevent that the product (4), when becoming overbalanced by means of gravity, turns/tilts down onto the reversing roller (13) of the first conveying system (12)

Figure 2B:
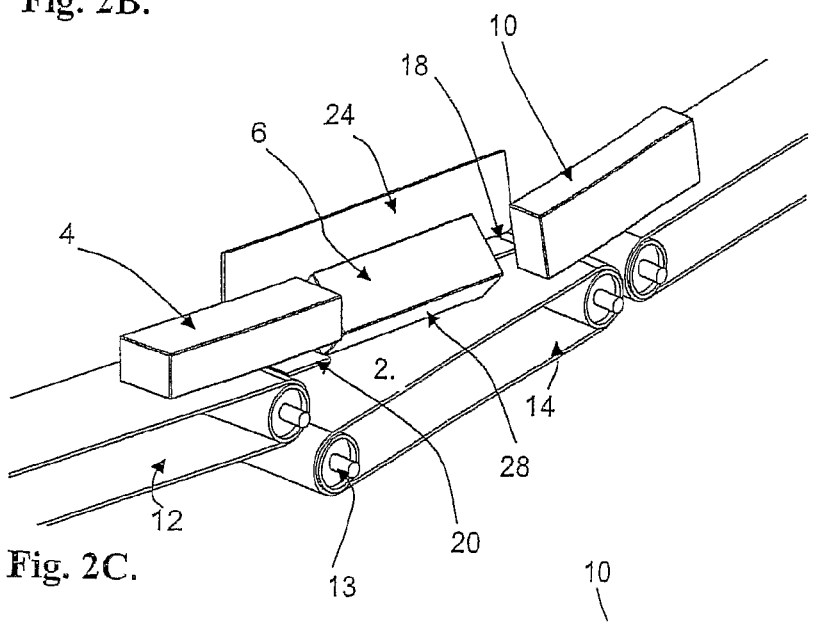

On FIG. 2B appears a product in the turning arrangement, where it is half turned (6), the next product (4) is furthermore on its way into the turning arrangement (2) as it has functioned as a pusher for the now turning product (6).

Figure 2C:
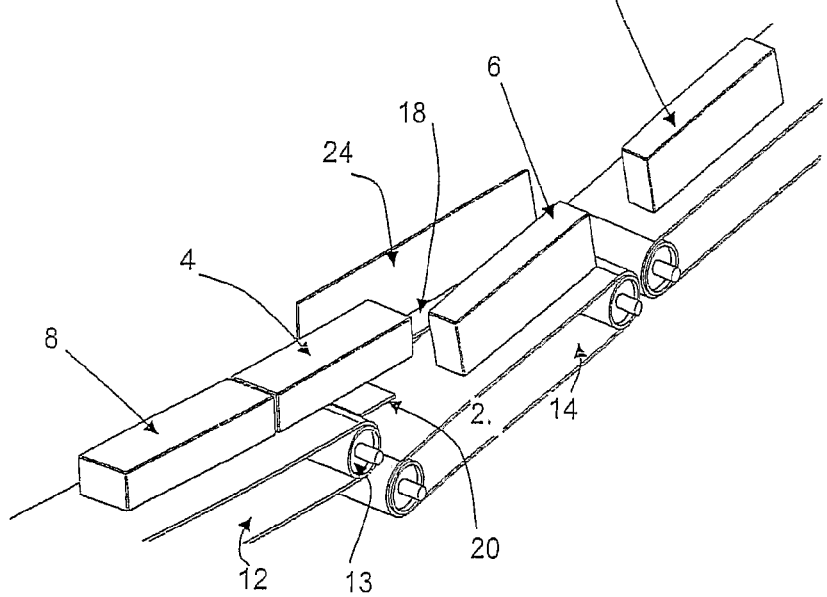

On FIG. 2C appears the turned product (6) in the turning arrangement (2), the next product (4) is still on its way into the turning arrangement (2) while at the same time the now turned product (6) is conveyed out of the turning arrangement (2) of the transporting system in the turning means (14) and onwards to the next transport arrangement (16) conveying the product on to packing, further turning or control arrangements or otherwise.

LIST OF REFERENCE NUMBERS

2. Block turning arrangement
4. Product on its way into the turning arrangement
6. Product in the turning arrangement, just turned
8. Product on its way into the turning arrangement
10. Products on their way away from the turning arrangement
12. Transporting system before the turning arrangement
13. Reversing roller for the transporting system
14. Transporting system in turning arrangement
16. Transporting system after the turning arrangement
18. Support rail
20. Carrier plate
22. Guide rail in turning means
24. Support plate in turning means under support rail
26. Downwards directed surface on product before turning
28. Surface which after turning becomes downwards directed
30. Guide rails for products before and after the turning arrangement

The invention claimed is:

1. Block turning arrangement (2) which via the force of gravity turns/raises concrete products (4) which are conveyed by a transporting arrangement, wherein the concrete products (4) in the same direction of travel as said products are conveyed in the transporting arrangement, are pushed out upon a support rail (18) which is narrower than the downwards facing surface (26) of the products, and when the product have been pushed completely out on the support rail, the product (6) turns/tilts one quarter of a turn about the longitudinal axis of the product by means of the force of gravity.

2. Block turning arrangement according to claim 1, wherein a guide rail (22) arranged opposite the support rail (18) ensures that the turned concrete product (6) does not continue its rotation and simultaneously guides the concrete product out of the turning arrangement (2) by means of a second transporting system (14).

3. Turning arrangement (2) according to claim 1, wherein the products are conveyed to the turning arrangement on a first transporting system, and that the first part of the support rail (18) is designed as carrier plate (20) supporting the concrete product in its entire width to prevent that the concrete product (4) from rotating by the force of gravity and thereby striking a reversing roller (13) arranged in the first transporting system (12) bringing the concrete products (4) into the turning arrangement (2), and that the carrier plate (20) projects in over part of a second transporting system (14) which is arranged for transport through the turning arrangement (2) itself.

4. Turning arrangement (2) according to claim 1, wherein guide rails (30) are arranged along the first transporting system (12) and along the transporting system (16) after the turning arrangement (2).

* * * * *